Jan. 22, 1957　　　　　D. N. GOLDBERG　　　　　2,778,470
FLEXIBLE BRAKE OR CLUTCH BAND
Filed Jan. 26, 1954　　　　　　　　　　　　4 Sheets-Sheet 1
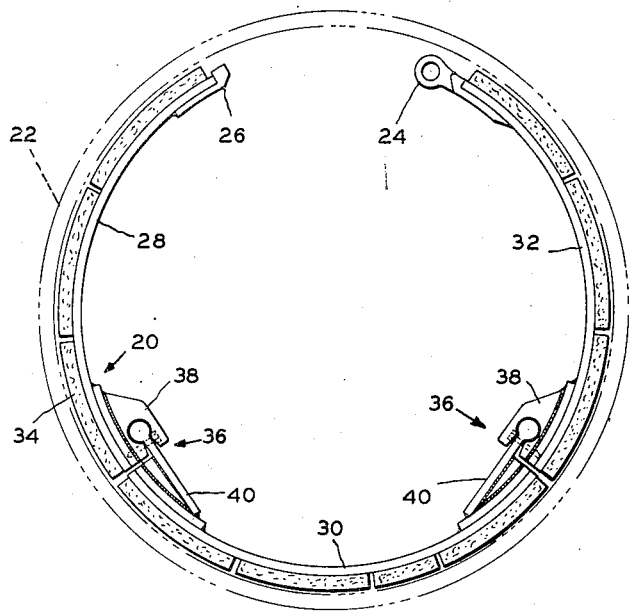
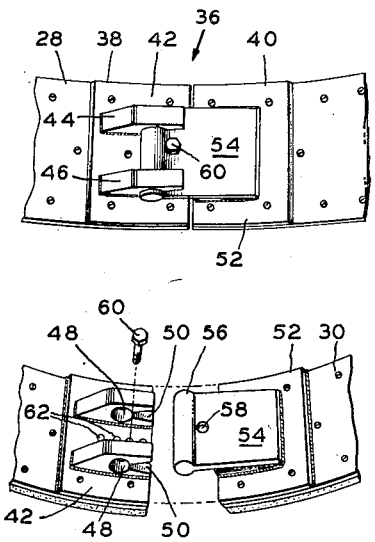
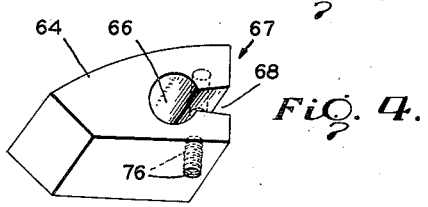
INVENTOR
David N. Goldberg.
BY
*Gustave Miller*
ATTORNEY Jan. 22, 1957 D. N. GOLDBERG 2,778,470
FLEXIBLE BRAKE OR CLUTCH BAND
Filed Jan. 26, 1954 4 Sheets-Sheet 2

INVENTOR
David N. Goldberg.
BY Gustave Miller
ATTORNEY

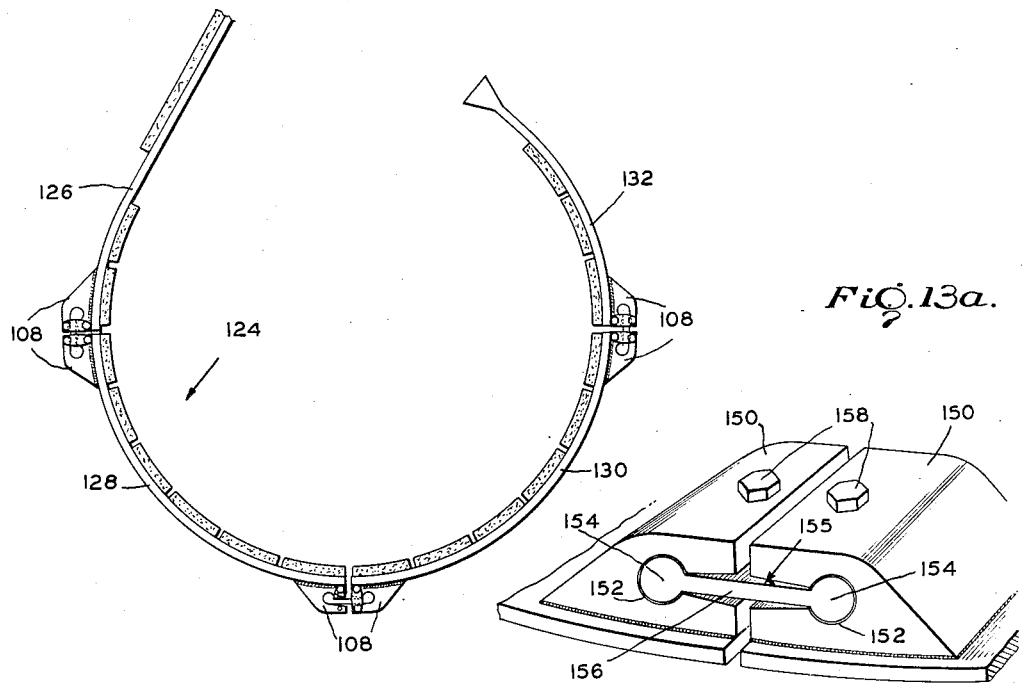
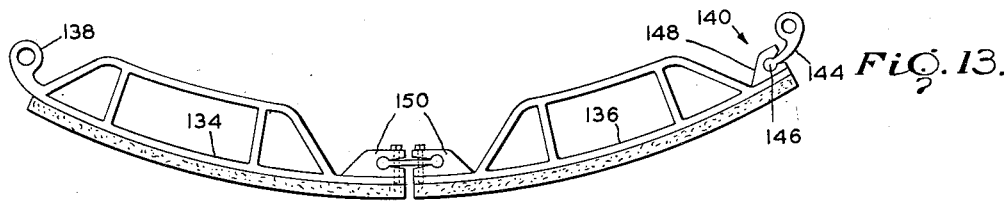
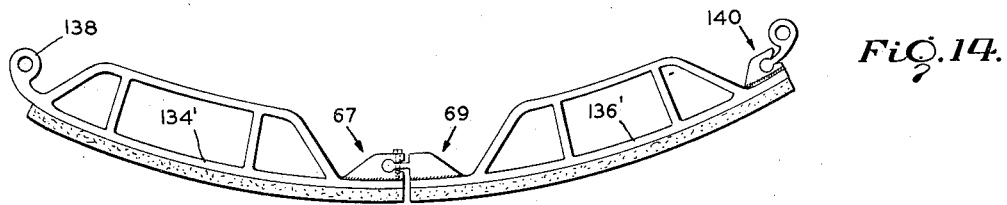

Jan. 22, 1957  D. N. GOLDBERG  2,778,470
FLEXIBLE BRAKE OR CLUTCH BAND
Filed Jan. 26, 1954  4 Sheets-Sheet 4
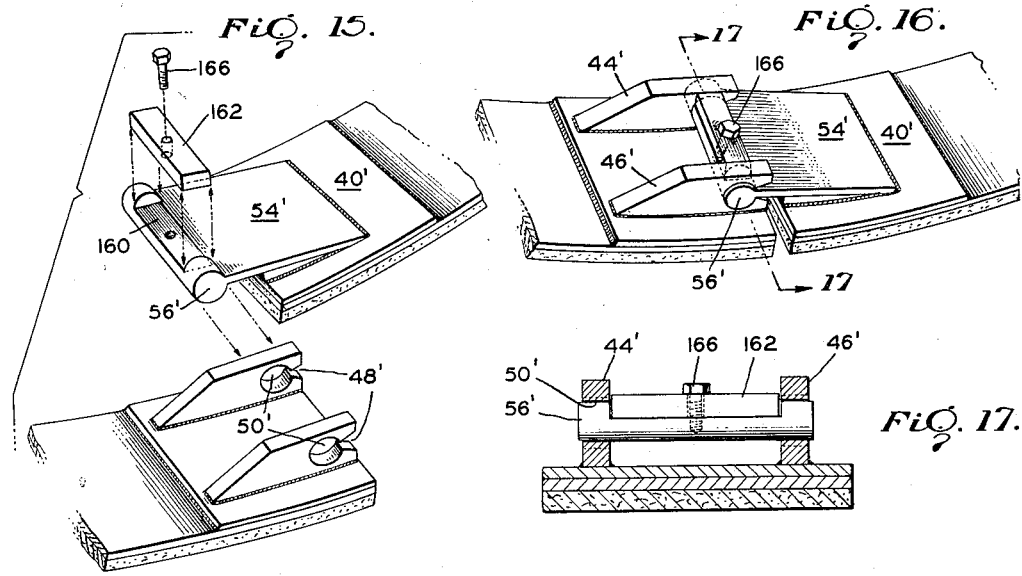
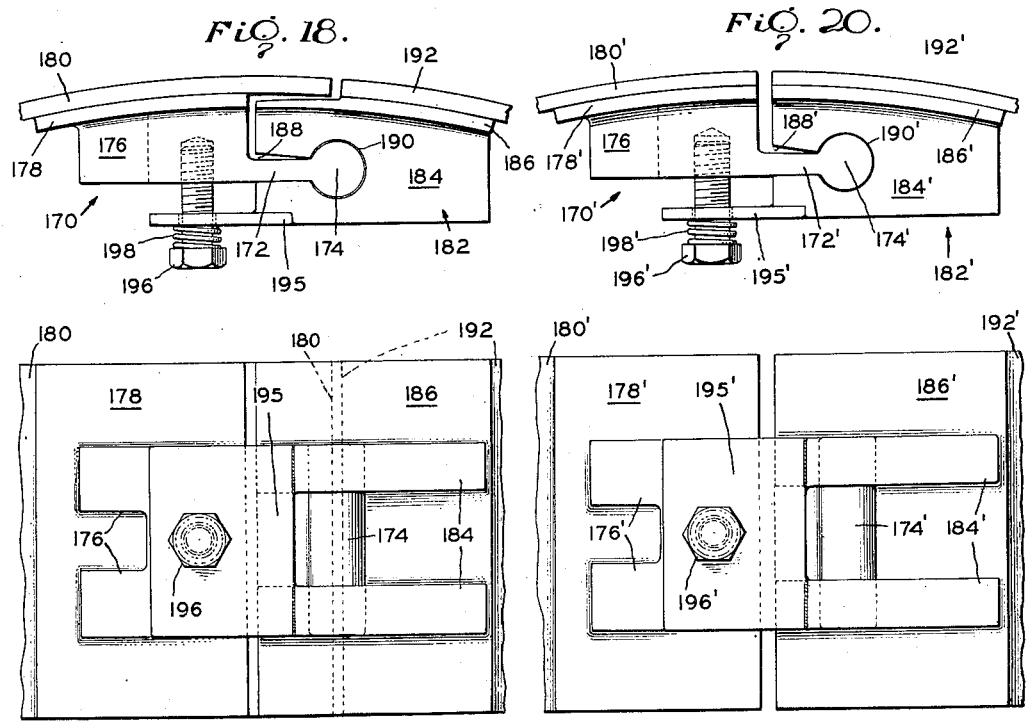
INVENTOR.
David N. Goldberg
BY
Gustave Miller
ATTORNEY

2,778,470
FLEXIBLE BRAKE OR CLUTCH BAND

David N. Goldberg, Wheeling, W. Va.

Application January 26, 1954, Serial No. 406,104

22 Claims. (Cl. 192—107)

This invention relates to braking devices, and more particularly to an articulated or sectionalized brake or clutch band which automatically compensates for wear of the brake lining material. The sectionalized or articulated braking device of the invention is adapted for use either externally or internally of a brake or clutch drum.

In the use of conventional brake shoes, either of the rigid, semi-rigid or flexible type, consider, for example a rigid brake shoe positioned internally of a brake drum. Such a brake shoe is arced to a smaller diameter than the drum diameter, and a frictional wearing surface is disposed on the outer surface of the brake shoe for frictional engagement with the inner surface of the brake drum. Peak efficiency of the brake shoe and its wearing surface is obtained when the wearing surface diameter conforms to the drum diameter, in which case, the maximum area of both the brake shoe and drum are engaged and the applied pressure is evenly distributed against the area of both the wearing or frictional surface and the drum. However, experience has shown that as wear takes place on the frictional material carried by the brake shoe, there is a continuous reduction of the area of contact between the wearing surface carried by the brake shoe and the surface of the drum which it engages.

Throughout this specification, the invention will be described as embodied in a brake shoe and drum assembly. However, it will be understood that the invention is equally applicable to a clutch assembly.

This reduction of area of contact between the frictional wearing surface of the brake shoe and the surface of the drum results in many ill effects. Thus, there is a continuing loss of brake or clutch efficiency due to the decreasing area of the frictional wearing surface engaged with the drum surface.

Also, the wearing surface of the brake shoe which does remain in contact with the brake drum becomes worn at a much faster rate than normal due to the fact that the reduced area remaining is called upon to provide the same braking action as the braking action intended to be carried by the entire original wearing surface.

There is also the additional factor that the portion of the wearing surface which has become disengaged from the drum surface becomes wasted insofar as any braking or clutching action is concerned.

A further ill effect of the decreased wearing surface in contact with the brake drum is the generation of excessive temperatures due to the concentration of the applied pressure upon the decreasing area of wearing surface. This frequently results in damage to the brake drum, such as heat checking, cracking and breakage. The efficiency of the pressure systems energizing the brake shoe also becomes lowered when wearing occurs in conventional brake bands or shoes, since part of the pressure of the system is expended in overcoming line pressure of the brake shoe itself. Also, there is the factor that with a reduced area of wearing surface in contact with the brake drum, a longer time is required to seat or break in the brake shoe or band onto the drum surface due to the unevenness of the applied pressure.

Many of the observations just made with respect to rigid brake shoes also apply to brake shoes of the flexible and semi-rigid types. In the case of flexible and semi-rigid brake shoes used on internal drum surfaces, there is the additional problem that decrease in the area of the wearing surface causes the brake shoe to be bent or crowded out of its original arc diameter, resulting in loss of efficiency of the brake or clutch system. In the case of flexible and semi-flexible brake shoes applied to an external drum surface, continuous flexing and pulling of the brake band from a large arc diameter to a smaller arc diameter damages the band and sets up in the band a series of different arc diameters, resulting in an uneven wearing surface and a resultant uneven distribution of applied pressure.

Still a further problem, particularly in the case of brake shoes used on external drum surfaces is a tendency to misalignment which occurs, which sets up vibrations resulting in cracking and breaking of the bands.

Accordingly, it is an object of this invention to provide a brake shoe or brake band assembly which automatically compensates for wearing of the frictional material carried by the brake shoe and automatically changes its arc of contact to compensate for such wear.

It is another object of this invention to provide a brake shoe assembly which provides a leverage mechanism which increases and distributes evenly the applied pressure to keep the wearing material in contact with its drum surface.

It is still another object of this invention to provide a brake shoe assembly which maintains a maximum area of frictional wearing surface engaged with the drum surface to thereby maintain a low rate of wear which prolongs the life of the wearing material beyond that experienced in brake shoe assemblies of the prior art.

It is a further object of this invention to provide a brake shoe assembly which is easily installed.

It is still a further object of this invention to provide a brake shoe assembly which maintains a low even temperature in both the frictional wearing surface and the brake drum, thereby resulting in a longer life span for both the wearing material and the brake drum.

It is still another object of this invention to provide a brake shoe assembly which keeps to a minimum the flexing or crowding of the brake shoe out of its formed original arc.

It is still another object of this invention to provide a brake shoe assembly which keeps the various sections of the brake shoe in circumferential alignment with each other thereby eliminating twisting and stretching of the brake shoes as commonly occurs with certain types brake shoe assemblies now in use.

In accordance with these objectives, this invention provides an articulated or sectionalized brake shoe or band assembly in which the adjacent sections are interlocked by male and female hinge members which positively couple the adjacent shoe sections together and yet permit a pivotal motion which permits the hinged members to vary the overall arc made by the brake shoes to compensate for wear.

The invention, together with further objects and advantages thereof, may best be understood with reference to the following description taken in connection with the accompanying drawings in which:

Fig. 1 is a side elevational view of a brake shoe assembly in accordance with the invention, adopted for engagement with an internal drum surface.

Fig. 2 is an enlarged fragmentary perspective view showing the details of the assembled joint between two adjacent brake shoe sections.

Fig. 3 is an enlarged fragmentary exploded perspective view of the elements shown in Fig. 2.

Figs. 4 and 5 are perspective views of female and male locking members of a slightly modified type.

Fig. 6 is a side elevation of a modified type of hinge knuckle assembly for use with external type brake bands or shoes.

Fig. 12 is a side elevation view of a complete brake shoe assembly of the external type using the double offset male pivotal joining link shown in Figs. 8, 10, and 11.

Fig. 13 is a view of a two section brake band assembly of the internal type having a double headed male connecting link, in which the heads are in alignment with the axis of the link.

Fig. 13a is an enlarged detail view of the locking knuckles used in Fig. 13.

Fig. 14 is a view of a two section brake shoe of the internal type utilizing locking members of the type shown in Figs. 4 and 5.

Fig. 15 is a perspective exploded of a hinge connector assembly using a modified form of stop arrangement used to prevent a side-wise movement of the male locking member with respect to the female connector elements.

Fig. 16 is a perspective assembled view of the assembly of Fig. 15.

Fig. 17 is a view in section along line 17—17 of Fig. 16.

Fig. 18 is a side elevation view of a modified type of connector assembly in accordance with the invention.

Fig. 19 is a bottom plan view of the assembly of Fig. 18.

Fig. 20 is a side elevation view of another modified type of connector assembly in accordance with the invention.

Fig. 21 is a bottom plan view of Fig. 20.

Figure 7:
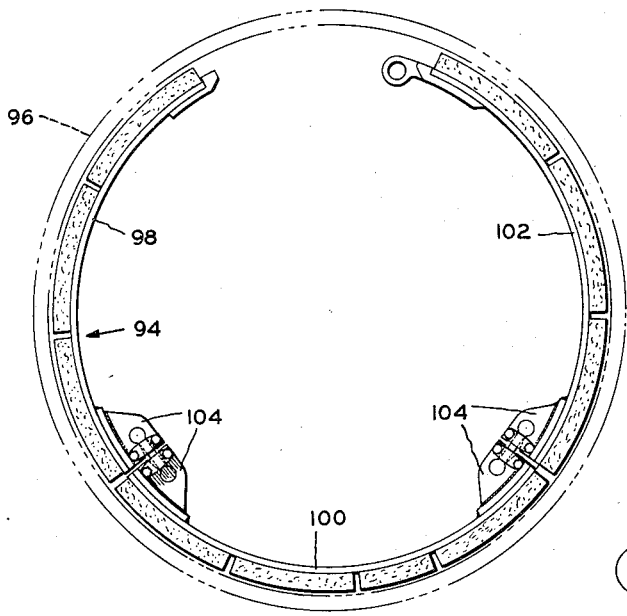
Fig. 7 is a view of a still further modified form of knuckle assembly which may be used for an internal type brake shoe or band.

Referring now to the drawings, and more particularly to Figs. 1–3, there is shown a brake band or brake shoe assembly generally indicated at 20 of the internal type which is disposed radially inwardly of the inner surface of a brake drum 22. The brake shoe assembly is provided at one end with an anchoring means 24 which is anchored in accordance with the conventional practice by means of a pin which may be fixed or which in some instances may be adjustable or floating. The opposite end 26 of the brake shoe assembly is the live or cammed end and is activated by conventional means such as air, hydraulic or mechanical leverage.

The brake shoe assembly 20 may be sectionalized into any desired number of sections and in the embodiment shown in Fig. 1 comprises three sections 28, 30, and 32. Each of the brake shoe sections is provided on its outer periphery with a suitable brake lining material 34, which engages the braking surface of the drum 22.

In accordance with the invention, each of the sections 28, 30, and 32 is joined to its adjacent section by means of a hinged knuckle assembly generally indicated at 36, the details of which are shown in Figs. 2 and 3. Each assembly 36 comprises a female section 38 and a male section 40. The respective knuckle locking sections 38 and 40 are positioned on the radially inner surface of the respective brake shoe sections.

As will best be seen in Figs. 2 and 3, the female knuckle section 38 which is connected to one end of the brake shoe section 28 is mounted on a plate member 42 which is in turn rigidly attached to the end of the brake shoe section 28. The female unit comprises a pair of laterally spaced apart rib members 44 and 46, each of which is provided intermediate of its length with a generally cylindrical socket 48, each socket 48 extending laterally through its respective rib member 44 or 46. Each of the rib members 44 and 46 is also provided with a tapered dove-tail slot 50 which extends from the end of the rib member directed toward the male locking member and into communication with the socket member 48 of the respective rib member.

The male locking unit 40 comprises a base plate 52 which is rigidly secured in any suitable manner to the end of the brake shoe 30, and a web or plate member 54 which is rigidly attached to the outer surface of the base plate 52. The web member 54 extends beyond the outer edge of the brake shoe section 30 and also beyond the edge of the base plate 52 and terminates in a generally cylindrical shaped pintle or lug portion 56, which, in the embodiment of Figs. 1–3 is symmetrically positioned with respect to the upper and lower surfaces of the plate member 54. That is, the pintle or lug member 56 projects an equal distance above and below the web or plate 54. The male unit 40 is engaged with the female unit 38 by sliding the web member 54 with its pintle 56 sidewise or laterally through the socket 48 and connecting slot 50 of first one rib, and then through the corresponding socket and passage of the other rib to thereby cause the male and female units to be engaged in the manner shown in Fig. 2.

The slots 50 of the respective rib members 44 and 46 taper outwardly in the direction of the male locking unit. The distance between the opposite faces of each slot 50 are sufficiently greater than the thickness of web 54 to permit a limited pivotal movement of the male unit 40 with respect to the female unit 38.

To prevent any lateral displacement of the male and female locking units with respect to each other after they have become engaged in the manner shown in Fig. 2, the web or plate 54 is provided with a passage 58 through which a bolt 60 is passed, the lower end of bolt 60 being received in an aligned screw threaded aperture 62 in the plate member 42 of the female unit. The passage 58 is made sufficiently large to permit the desired degree of pivotal motion of the male unit 40 with respect to the female unit 38.

There is shown in Figs. 4 and 5 the female and male elements respectively of a modified form of swivel locking device, which is intended for use with an internal type brake band of the type shown in Fig. 1. Instead of using two spaced apart rib members as shown in Figs. 2 and 3, only a single upright rib member 64 is used, member 64 being provided with a socket 66 which communicates with a dove-tail slot 68. The male member comprises a vertical rib member 70 having projecting therefrom a web member 72, which carries at its outer edge a generally cylindrical pintle member 74.

The male and female members of Figs. 3 and 4 are engaged by sliding the pintle member 74 into the socket 66, the web portion 72 engaging the dove-tail slot 68. These members have a limited pivotal movement with respect to each other, as explained in connection with the embodiment of Figs. 1–3. In order to prevent lateral or sidewise motion of the male member with respect to the female unit, a passage 76 may be provided in the female member in alignment with the enlarged aperture 78 of the male member to receive a suitable bolt or other fastening means which will prevent lateral displacement of the male and female units with respect to each other, but which will permit free pivotal movement of the male and female units with respect to each other.

There is shown in Fig. 6 a side elevation view of a complete brake shoe assembly generally indicated at 80 which is of the external type and which surrounds a drum 82. The brake shoe assembly 80 is formed of sections 84, 86, 88, and 90 and a suitable brake lining material 34' is attached to the inner surface of each of the sections of the brake shoe assembly 80 for engagement with the outer surface of the brake drum 82. Each of the adjoining brake shoe sections are coupled by locking knuckle assemblies generally indicated at 92 and comprising male and female elements as shown in Figs. 3 and 4. It will be noted that the pintle 74' of the male unit 69' shown in Fig. 6 is not symmetrical with respect to the web 72', as in the case of the embodiment shown in Figs. 4 and 5. Instead, the radially outer portion of the periphery of pintle 74' is substantially tangent to the radially outer surface of web 72' and the radially inner portion of the periphery of pintle 74' projects radially inwardly of the radially inner surface of web 72'. In other words, the axis of the pintle 74' does not lie on the longitudinal axis of the web 72', but instead is laterally offset therefrom in a radially inward direction. Thus, the pintle 74' is not symmetrically disposed with respect to the plane of the web 72'. On external type brake shoes, this laterally offset arrangement of the pintle with respect to the connecting web is preferable and provides a better pivotal action than if the axis of the pintle were in alignment with the longitudinal axis of the web.

Figure 10:
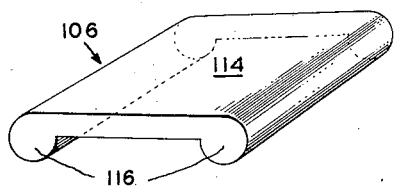
Fig. 10 is a perspective view of the male knuckle element of the assembly of Fig. 8.
Figure 8:
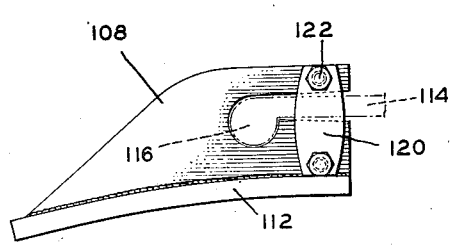
Fig. 8 is a side elevational view partly broken away, of a knuckle assembly used with an external type brake band.

There is shown in Fig. 7 a brake shoe assembly of the internal type generally indicated at 94 and disposed internally of a brake drum 96. The brake shoe assembly 94 comprises a plurality of sections 98, 100, and 102. In this form of the invention each of the adjacent ends of adjoining brake shoe sections are provided with female locking units 104 and a double headed male connecting link 106, as shown in Fig. 10, serves to join the two adjacent female sections together.

Figure 9:
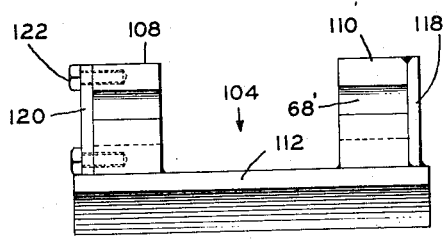
Fig. 9 is a front elevation of the female element of the knuckle assembly of Fig. 8.
Figure 11:
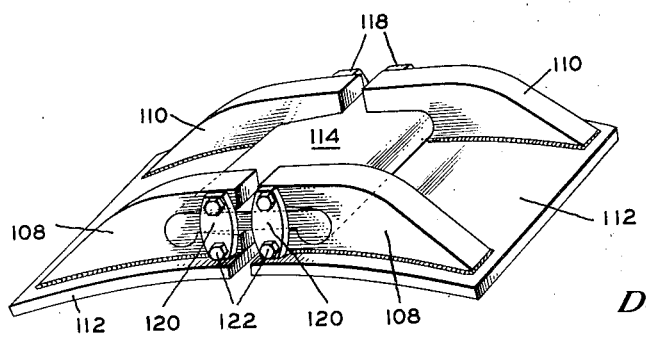
Fig. 11 is a perspective view showing the knuckle assemblies of two adjacent brake band sections joined together, using the knuckle assembly of a type shown in Fig. 8.

As may best be seen in Fig. 9, each of the female locking units 104 comprises a pair of laterally spaced apart rib members 108 and 110, which are rigidly attached in any suitable manner to a base plate 112, which in turn is rigidly attached to the end of one of the respective brake shoe sections. Each of the rib members 108 and 110 is provided with a socket and a communicating slot of the type previously described for receiving the pintle and connecting web portions of a male locking member similar to locking member 106 shown in Fig. 10. The male locking member or connecting link 106 comprises a central web portion 114, which carries at its outer ends pintle members 116. In the form shown in Fig. 10, the pintle members 116 have their respective axes off-set with respect to the longitudinal axis of web 114, which is preferable for use with an external band or brake shoe assembly. However, if the connecting ling 106 were intended for use with an internal brake shoe or band assembly shown in Fig. 7, the pintle members 116 would not be off-set with respect to the connecting web portion 114, but instead, would be symmetrical with respect to the web 114, as shown in the embodiment of Fig. 7 and also in Figs. 13 and 13a In order to prevent lateral displacement of the male connecting link 106 with respect to the female units 104, a stop member 118 is rigidly attached, as by welding or any other suitable means, to the laterally outer edge of the rib member 110 of each female unit 104 in such manner as to cover the outer lateral edge of the web-receiving slot. A similar stop member 120 is attached to the laterally outer edge of each of the rib members 108. One of the stop members, such as member 118, may be left permanently in place. However, to permit access of the male link member to the sockets of the rib members 108 and 110, it is necessary that the other stop member, such as member 120 be detachably connected, as by means of bolts 122. After the male link member 106 has been positioned in place, the stop member 120 is then bolted into place by means of the bolts 122 shown in Fig. 9.

The double off-set male pivotal connecting link shown in detail in Figs. 8–11 is shown in Fig. 12 embodied in a complete brake shoe assembly generally indicated at 124 and comprising a plurality of brake shoe sections 126, 128, 130 and 132 intended for use externally of a brake drum which is not shown in the view of Fig. 12.

There is shown in Fig. 13 a brake band assembly for use internally of a brake drum and comprising sections 134 and 136. The brake shoe section 134 carries at its outer end the cam or activating end 138 which is engaged by a suitable actuating means. The brake shoe section 136 carries at its outer end the anchor means 140 which is provided with an eyelet member 142 which receives an anchoring pin in accordance with the usual practice. The eyelet 142 is positioned at the outer end of a web portion 144 which is provided at its inner end with a pintle member 146 of the type previously described, the pintle member being received in a suitable socket in a female anchoring unit 148. Since the brake shoe assembly shown in Fig. 13 is for use internally of a brake drum, the pintle member 146 is not off-set with respect to the oppositely disposed surfaces of the connecting web or link 144, but instead is symmetrical with respect thereto as previously explained.

At their inner or adjacent ends, each of the brake shoe sections 134 and 136 is provided with a female knuckle or locking unit 150 as shown in detail in Fig. 13a. Each of the female locking units 150 is provided with a socket 152 for receiving the oppositely disposed pintles 154 which are joined together by the connecting web portion 156. It will be noted that only a single female locking unit 150 is used on each of the respective brake shoe sections rather than using two spaced apart rib portions as in the case of the embodiment of Figs. 8 and 9.

The respective female units 150 extend for the entire width of the double headed male locking member 155. In order to prevent lateral or sidewise displacement of the male locking element 155 with respect to the female locking units 150, bolts 158 pass downwardly through the female units 150 and engage the web portion 156 of the male locking member. The aperture in web 156 which receives the bolt 158 is sufficiently elongated to permit pivotal motion of the male locking members with respect to the female members.

In Fig. 14 there are shown two brake shoe sections 134' and 136' for disposition internally of a brake drum. The brake shoe sections 134' and 136' are provided with the same actuating and anchor connections 138 and 140, respectively, as previously described in the embodiment of Fig. 13. The brake shoe sections 134' and 136' are connected together by the male and female elements 67 and 69 previously described in connection with Figs. 4 and 5.

There is shown in Figs. 15, 16 and 17 a modified form of stop arrangement which may be used in connection with an embodiment of the type shown in Figs. 2 and 3, in which the female unit has two spaced apart rib members. The male locking unit comprises a web or plate 54' which is rigidly attached to a base plate 40' which in turn is attached to the surface of the brake shoe. The pintle member 56' is carried by the outer edge of the web 54'. The pintle 56' is received in sockets 50' in two laterally spaced female rib members 44' and 46', each of which is provided with a socket and communicating slot 48' and 50', respectively.

The pintle member 56' is provided with a countersunk surface 160 of substantially the same lateral width as the spacing between the two laterally spaced rib members 44' and 46'. After the male unit has been positioned in assembled relation with respect to the female unit, a block member 162 is positioned in the countersunk surface 160. The block 162 is of sufficient height to project above the upper surface 164 of the pintle 56', the projecting portion of the block 162 being sufficient to prevent any lateral displacement of the pintle 56' along the sockets 50'. The block 162 is held in position on pintle 56' by a bolt 166 which passes through a bore in the block 162, the bolt 166 being received in a screw-threaded bore in the pintle 56'.

There is shown in Figs. 18 and 19 a still further modified embodiment of the invention which is particularly intended for use with brake and clutch constructions of the internal type in which the brake or clutch shoe is positioned inwardly of the brake drum. This arrangement provides a spring biasing means for normally positively retracting the brake shoe sections to their minimum diameter and prevents any tendency of the brake shoe sections to buckle radially inwardly about their pivotal connections. There is shown in Figs. 18 and 19 a male connecting member generally indicated at 170 and comprising a web member 172 which carries at its outer end a pintle member 174. The web 172 is supported by a bracket member 176 which is rigidly attached to a base plate 178. The base plate 178, in turn, is rigidly attached to the brake shoe section 180. The female connecting member generally indicated at 182 includes a pair of rib members 184 supported by a base plate 186. Each rib member 184 is provided with a tapered slot 188 which communicates with a socket 190. The base plate 186 is rigidly attached to the brake shoe section 192.

In accordance with the construction shown in Figs. 18 and 19, the split between the two brake shoe sections 180 and 192 is in radial alignment with the pivot point of the pintle member 174 supported by the socket 190. This is accomplished by having the brake shoe section 180 project beyond the base plate 178 of the male connecting member in such manner as to overlie the base plate 186 of the female connecting member. The base plate 186 is tapered radially inwardly to a slight extent in the region where the brake shoe section overlaps the base section 186 to minimize binding between the brake shoe and the base section 180, the brake shoe section 192 does not extend to the outer end of the base plate 186, but instead extends only to a line substantially in radial alignment with the pivot point of pintle 174.

An important feature of the construction of Figs. 18 and 19, as well as of Figs. 20 and 21, is the plate 195 which is rigidly attached to the radially inner surface of the rib members 184 of the female connecting member 182. The plate 195 extends underneath the bracket 176 of the male connecting member and is attached thereto by means of a bolt 196. The plate 195 is provided with an aperture for the passage of the bolt 196 which is of sufficient size to permit a degree of freedom of motion of the male and female connecting members 170 and 182 with respect to each other. A spring 198 is disposed between the radially inner surface or bottom surface with respect to Fig. 18 of the plate 195 and the head of the bolt 196. Spring 198 biases the plate 195 in a clockwise direction with respect to the view shown in Fig. 18 until the radially inner edge of the tapered slot 188, or lower edge of the slot with respect to the view shown in Fig. 18, abuts against the radially inner surface of web 172. This tends to maintain the brake shoe sections at their minimum diameter, and thereby overcomes any tendency of the brake shoe sections to move in a radial inward direction when braking power is applied.

The embodiment shown in Figs. 20 and 21 is in general similar to that described in connection with Figs. 18 and 19 and employs a plate 195' attached to the radially innermost surface of the female connecting member 182' and adapted to underlie the bracket portion 176' of the male connecting member 170'. The biasing spring 198' urges the plate member 195' in a clockwise direction with respect to the view shown in Fig. 20, thereby causing the male and female members to normally assume an arc of minimum diameter.

The embodiment of Figs. 20 and 21 differs from that of Figs. 18 and 19 in the fact that the split between the brake band sections 180' and 192' occurs at a point which is offset with respect to the pivot point of the pintle 174' carried by the male connecting member. Thus, in the embodiment of Figs. 20 and 21, the brake band 180' extends circumferentially only as far as the base plate 178', and similarly, the brake shoe section 192' extends as far in a circumferential direction as the base plate 186'. There is no overlapping of the brake shoe section of the male connecting member with respect to the base plate of the female section, as in the embodiment of Figs. 18 and 19. As a result of this construction, the split between the brake band sections 180 and 192' occurs along a radial line which is circumferentially offset with respect to the pivot point of the pintle 174'.

The unbalancing of the pivot point with respect to the split in the brake shoe sections as shown in Figs. 20 and 21 results in an increased leverage effect toward the brake drum. The same effect is also gained to a smaller degree by making the diameter of the pintle carried by the male connecting member smaller than the socket of the female connecting member, to thereby provide a cam action toward the brake drum.

It can be seen from the foregoing that there is provided in accordance with this invention a brake shoe pivotal joint or knuckle arrangement which permits an articulated brake shoe assembly to automatically change its diameter to compensate for wear in the frictional wearing surface carried by the brake shoes.

The hinge knuckle assembly of the invention furnishes an additional leverage mechanism which increases and evenly distributes the applied pressure to maintain the frictional wearing material in contact with the drum surface. Each assembly incorporates a fulcrum action about which the brake shoe sections can exert leverage. The assembly allows the brake shoe to automatically increase its arc diameter to compensate for wear in its wearing surface and to maintain at all times a maximum area of working surface engaged with the drum surface with a resulting high efficiency of brake or clutch action. The assembly helps to maintain an even temperature of the engaging surfaces, resulting in longer life of the frictional material and also of the brake drum.

Furthermore, the hinge knuckle assembly of the invention decreases the centralization of applied pressure to any small area of working surface, but instead provides an equal distribution of the applied pressure over the entire working surface. The knuckle assembly facilitates fast seating of the wearing surface with respect to the drum thereby preventing loss of time required for breaking in which is often experienced with other types of brake shoe assemblies.

Furthermore, while the knuckle assembly permits the brake shoes to change their overall diameter to conform to the wear which has occurred on the frictional surface, at the same time the assembly reduces and keeps to a minimum the flexing or crowding of brake shoe out of its formed original arc, since the change in diameter is provided by the pivotal movement of the plurality of swiveled sections. The keeping to a minimum or elimination of flexing or crowding of the brake shoe results in keeping the brake shoe in the correct arc diameter for wear surface and drum engagement, and also preserves the arc diameter of the brake shoe for future installation of wear surface material.

The assembly also keeps the brake shoe in lineal arc circumferential alignment, thereby compensating for misdirection of the activating or anchoring ends of the brake shoe, and also compensating for any starting torque misalignment. This eliminates twisting and stretching of the brake shoe composition which is often experienced with other types of brake shoes now in use. Due to its sectionalized construction and the simplicity of its assembly, the brake shoe sections may be easily installed and removed.

While the knuckle assembly has been described as embodied in a braking device the construction is equally applicable to a clutching device.

While there have been shown and described particular embodiments of the invention, it is aimed to cover all such changes and modifications thereof as fall within the true spirit and scope of the invention.

Having thus set forth and disclosed the nature of this invention, what is claimed is:

1. An articulated brake or clutch shoe assembly comprising a pair of hinged shoe sections, and hinge means for coupling said sections together comprising a male hinge member having a web portion of appreciable width disposed transversely of the end of one of said sections, a pintle means connected to said web portion, and a female hinge member for connection to said male member, said female member having a socket extending transversely of the end of the other of said sections for receiving said pintle member and a slot portion in communication with said socket for receiving said web member.

2. An articulated brake or clutch shoe assembly comprising a pair of hinged shoe sections, a male connecting member attached to one of said sections and a female connecting member attached to the other of said sections, said male member comprising a web member of appreciable width and a pintle means carried by said web member, said female member comprising a socket portion and a slot in communication with said socket and inclined toward said male member, said pintle means being disposed to extend transversely across a substantial portion of the width of the shoe sections and received in said socket with said web being received in said slot.

3. A brake or clutch shoe assembly as defined in claim 2 in which the pintle means of said male member is symmetrically disposed with respect to the longitudinal axis of the web portion of said male member.

4. A brake or clutch shoe assembly as defined in claim 2 in which the pintle means of said male member is offset with respect to the plane of the web portion of said male member.

5. An articulated brake or clutch shoe assembly as defined in claim 2 in which means are provided to prevent lateral shifting of said male and female connection members with respect to each other.

6. An articulated brake or clutch shoe assembly as defined in claim 5 in which said means for preventing lateral shifting is a bolt joining said male and female members together, said bolt being received in passages in the respective members, said bolt permitting pivotal movement of said members with respect to each other but preventing lateral shifting of said members with respect to each other.

7. An articulated brake or clutch shoe assembly as defined in claim 2 in which said means for preventing lateral shifting is a pair of stop members fastened across the slot portions at the outer sides of said female member.

8. An articulated brake or clutch shoe assembly comprising a pair of hinged shoe sections, a female connecting member attached to an end of each of said shoe sections, each of said female connecting members including a socket and a slot in communication with said socket and directed toward the other shoe section, and a male connecting member for joining said two female members together, said male member comprising a web portion, a pintle means connected to each of the opposite ends of said web portion, one of said pintle means being received in the socket of one of said female members, the other of said pintle means being received in the socket of the other of said female members.

9. A brake or clutch shoe assembly as defined in claim 8 in which each of said female connecting members comprises a pair of laterally spaced rib portions, each of said rib portions including a socket and a slot in communication with said socket, said slots extending toward said male member, said male member extending between the rib portions of each of said female members, the pintle means at each end of the web portion of said male member being received in the sockets of the two rib members of one of said female members, the pintle means at the opposite end of said male member being received in the sockets of the two rib members of the other of said female members.

10. A brake or clutch shoe assembly as defined in claim 8 in which the pintles of said male member are symmetrically disposed with respect to the plane of the web portion of said male member.

11. A brake or clutch shoe assembly as defined in claim 8 in which the pintles of said male member are offset with respect to the plane of the web portion of said male member.

12. An articulated brake or clutch shoe assembly comprising a pair of hinged shoe sections, hinge means for said sections comprising a male connecting member and a female connecting member, said male member having a web portion and a pintle means carried by said web portion, said female member comprising a pair of laterally spaced rib portions, a socket in each of said rib portions, each of said rib portions having a slot in communication with the socket of the respective rib portion, said slots extending toward said male member, said male member extending between said rib portions, said pintle means being received in the sockets of both of said rib members, said web portion being received in the slots of both of said rib members.

13. A brake or clutch shoe assembly as defined in claim 12 in which means are provided for preventing lateral shifting of said male and female members with respect to each other.

14. A brake or clutch shoe assembly as defined in claim 13 in which said means for preventing lateral shifting comprises a raised portion detachably connected to said pintle means and extending between said rib portions.

15. An articulated brake or clutch shoe assembly comprising a pair of hinged shoe sections, a male connecting member attached to one of said sections and a female connecting member attached to the other of said sections, said male member comprising a web portion and a pintle means carried by said web portion, said female member comprising a pair of laterally spaced rib portions, a socket in each of said rib portions, each of said rib portions having a slot in communication with the socket of the respective rib portion, said slots being inclined toward said male member, said male member extending between said rib portions, said pintle means being received in the sockets of both of said rib members, said web portion being received in the slots of both of said rib members.

16. An articulated brake or clutch shoe assembly for disposition internally of a drum comprising a pair of hinged arcuate shoe sections, a male connecting member attached to one of said sections and a female connecting member attached to the other of said sections, said male member comprising a web portion and a pintle means carried by said web portion, said female connecting member comprising a slot for receiving said web portion and a socket for receiving said pintle means, and spring means carried by one of said connecting members for biasing said arcuate shoe sections toward their minimum diameter.

17. An articulated brake or clutch shoe assembly for disposition internally of a drum, said assembly comprising a pair of hinged arcuate shoe sections, a male connecting member attached to one of said sections and a female connecting member attached to the other of said sections, said male member comprising a web portion and a pintle means carried by said web portion, said female connecting member comprising a slot for receiving said web portion and a socket for receiving said pintle means, an extension connected to a radially inner portion of said female connecting member, said extension overlying said male connecting member and being spaced radially inwardly of said male member, and spring means biasing said extension toward said male member whereby said arcuate shoe sections are biased toward their minimum diameter.

18. An articulated brake or clutch shoe assembly as defined in claim 17 in which a bolt-like fastening means extends through said extension of said female member and into said male connecting member, with said spring means being disposed between the radially inner surface of said extension and a head portion of said fastening means which projects radially inwardly of said extension.

19. An articulated brake or clutch shoe assembly for disposition internally of a drum, said assembly comprising a pair of hinged arcuate shoe sections, a male connecting member attached to one of said sections and a female connecting member attached to the other of said sections, said male member comprising a web portion and a pintle means carried by said web portion, said female connecting member comprising a slot for receiving said web portion and a socket for receiving said pintle means, a plate connected to a radially inner portion of said female connecting member, said plate overlying said male connecting member and being spaced radially inwardly of said male member, and spring means biasing said plate toward said male member, whereby said arcuate shoe sections are biased toward their minimum diameter.

20. An articulated brake or clutch shoe assembly comprising a pair of hinged arcuate shoe sections, a male connecting member attached to one of said sections and a female connecting member attached to the other of said sections, said male member comprising a web portion and a pintle means carried by said web portion, said female member comprising a slot for receiving said web portion and a socket for pivotally receiving said pintle means, the shoe attached to said male connecting member circumferentially overlapping said female connecting member, the shoe attached to said female connecting member being circumferentially spaced from the end of said female connecting member, the shoes of said male and female connecting members abutting each other on substantially the same radial line as the pivot point of said pintle in said socket.

21. An articulated brake or clutch shoe assembly as recited in claim 16 wherein said pintle means carried by said web is smaller than said socket in which it is received whereby upon application of operating force to said assembly in use a combined pivotal and cam action will take place as the arcuate shoe sections move relative to each other and toward engagement with the interior drum surface.

22. An articulated brake or clutch shoe assembly comprising a pair of hinged shoe sections, and pivotal connecting means for coupling said sections together comprising a male connecting member attached to one of said sections having pintle means extending outwardly of said one of said sections, a female connecting member attached to the other of said sections having a socket providing a pivot axis extending transversely of the end of said other of said sections, said pintle means being received in said socket to pivotally interconnect said sections and said pintle means being smaller than said socket to provide limited lateral movement of said pintle means within said socket whereby upon application of operating force to said assembly in use a combined pivotal and cam action will take place as the arcuate shoe sections move relative to each other and toward engagement with the drum surface.

References Cited in the file of this patent

UNITED STATES PATENTS

| 399,964 | Benet | Mar. 19, 1889 |
| 780,136 | Sloan | Jan. 17, 1905 |
| 979,623 | Williams | Dec. 27, 1910 |
| 1,062,442 | Coulombe | May 20, 1913 |
| 1,529,087 | Reynolds | Mar. 10, 1925 |
| 1,917,184 | Sneed | July 4, 1933 |
| 2,046,306 | Fykse | June 30, 1936 |
| 2,571,432 | Farkas | Oct. 16, 1951 |